March 9, 1965 W. GRUBER 3,172,446
TIRE REPAIR PATCH
Filed Aug. 5, 1963
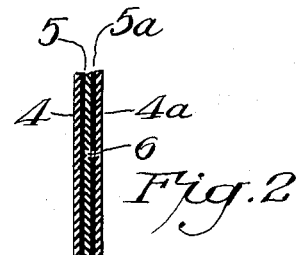
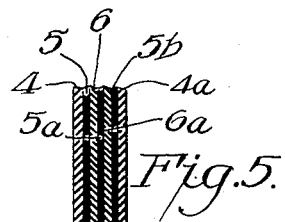
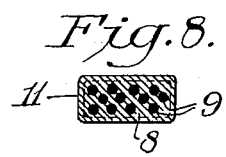
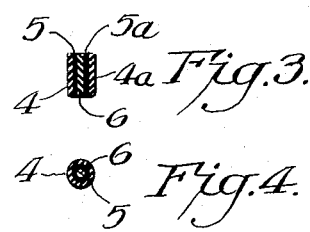
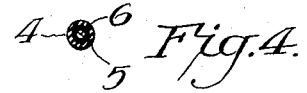
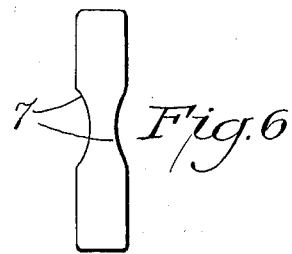
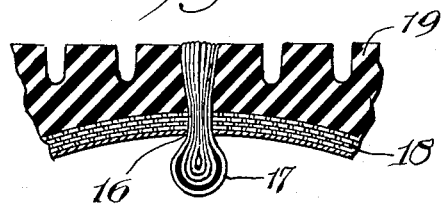
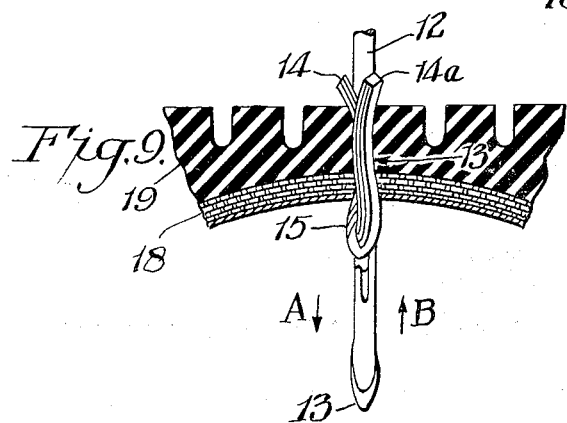
INVENTOR
Wilhelm Gruber
BY Connolly and Hutz
ATTORNEYS United States Patent Office 3,172,446
Patented Mar. 9, 1965

3,172,446
TIRE REPAIR PATCH
Wilhelm Gruber, Moehlstrasse 2, Munich 27, Germany
Filed Aug. 5, 1963, Ser. No. 299,977
Claims priority, application Germany, Aug. 13, 1962,
St 19,591
18 Claims. (Cl. 152—370)

The present invention relates to a tire repair patch.

It is known to repair tears or holes in automobile tires by filling the tear or puncture with a repair body in the form of a plug made of vulcanized caoutchouc which is inserted along the axis of the damage by using an awl or a similar tool. The repair body itself or the wall of the tear or puncture is made slippery with a rubber solution. The rubber plug has cylindrical shape and is fully vulcanized. If necessary, it consists of a hard, fully vulcanized core and a soft, fully vulcanized jacket. If this plug is threaded into the puncture with an awl, the plug's longer end protrudes into the interior of the tire. The plug then should hold because it is more or less constricted and can no longer be pressed out by the pressure of the tube or—in case of tubeless tires—by the inner air and fulling action caused by driving. In a similar way, one can also press tube-like hollow bodies with a tip on one side into the tear to be repaired with the help of a metal pin which is inserted in the hollow body and pulled out of again later.

The disadvantage in using such repair bodies is, first of all, that the relatively long end of the plug protruding into the inner tire, particularly tubeless tires, is subject to gyroscopic movements during car travel which brings about an extension of the tear and therewith the loosening of the filling and probably also the escape of the air within the tire. In case of tubeless tires, it causes the abrasion of the inner sealing layer, the so-called inner liner. Furthermore, it is known that the ageing phenomenon of vulcanized caoutchouc being unavoidable becomes apparent by shrinking and increasing brittleness. As observed frequently, this can result in breaking the head of the repair plug so that eventually the inner air penetrates in the fabric layers and separates them. This is even more likely because the plug is surrounded so tightly by the tread rubber that the compressed air cannot escape to the outside.

Other known processes make use of rubber strings or, as a variation of said process, rubberized or non-rubberized threads of the cord in the form of a bundle which are pressed into the tear, or hole-shaped damage. This type of repair was not very successful either because there is no guarantee that the individual strings form a compact and solid mass and, as a consequence, the disadvantages mentioned above permit the air to escape and allow contamination and foreign bodies to penetrate. In addition, the cord threads used have the tendency to absorb humidity in all places where the protecting rubber jacket is missing, for instance, in places where the threads are cut off at the outside of the tire so that the repair point is flush with the tread rubber. The cord threads then act as a wick to carry the humidity into the interior of the tire. Hereby, first the fabric and then the rubber rot eventually. Bubbles may form in the inner layers of the carcass which finally cause the tire to break. A lasting, safe repair and the prevention of accidents is guaranteed only when the tear-shaped puncture remains filled completely and tightly and, therefore, such a slow destruction of the filling substance has to be considered very disadvantageous. The repair bodies as described above are, therefore, applicable only for short-lived emergency repairs because the more or less hard rubber plugs consisting of fully vulcanized caoutchouc, even through they are covered with a rubber solution at the outside, are inserted only and hold in the puncture of the tire by mere pressure. These repairs have to be replaced as soon as possible by a competent hot vulcanization as the manufacturers themselves admit to some extent (see the journal "Die Gummibereifung," No. 6, June 1961, page 12).

I myself proposed and introduced commercially different processes and repair plugs. In one case, there was a repair body consisting of a slightly conical shaft terminating in an umbrella or arrow-like head. The head is inserted into a coarsened hole cleaned and prepared by a cleaning device and calibrated to the size of the repair body. The shaft and inner side of the umbrella or arrow head are covered with a non-vulcanized rubber layer. When inserting the repair plug, a vulcanizing paste containing an accelerator is pressed between said repair body and the wall of the prepared hole so that the repair body is vulcanized tightly into the tire with the help of the nascent sulphur diffusing from the wall of the hole.

This repair process proved to be satisfactory in practice and met approval in the entire field. Its exact performance, however, is conditioned by following accurately quite a number of processing steps and since, as it is known, instructions are read only superficially or not at all, mistakes soon presented themselves that were caused by an insufficient observation of the instructions.

There are also methods known where thin strips of 30 to 40 mm. length and about 10 mm. width of vulcanized rubber in a thickness of about 1 to 1.2 mm. covered on both sides with a coat of non-vulcanized, vulcanizable rubber in 0.2 mm. thickness are threaded into the puncture of the tire after a corresponding preparation of the hole. These thin strips are stretched by pressing them into the puncture whereby creases or folds are brought about. It even happens that they get entangled in the passage, and in all these cases there are formed detrimental air pockets. Furthermore, it appeared that the thin, vulcanized strips with their very thin contact layers are not suitable to completely fill a puncture in the tire that is not a round hole but rather a long and uneven tear with fissure crazes everywhere in the rubber and fabric. Some of this unevenness and fissure crazes continue to exist, and these cavities are apt to increase by the fulling action while driving, so that at least the durability of the repair is questionable.

The above-mentioned very thin contact layers on the outside vulcanize in a very short time by using a vulcanizing fluid, but also very fast by using a normal rubber solution because the sulphur or the accelerator travels from the vulcanized strip into the contact layer. Thus, only a relatively rigid, hard rubber strip remains in the hole because the contact layers have actually not had enough time before their complete vulcanization to penetrate the fine fissure crazes radiating from the puncture to be repaired as a soft and plastic matter with a sufficient volume.

In a variation of this known process two strips of vulcanized rubber are glued together with a rubber solution and coated on the outside with very thin contact layers. But it proved in practice that an improvement of the repair could not be attained in this way.

In a further method, a plate of vulcanized rubber coated on both sides with a non-vulcanized contact layer of a certain thickness is cut in strips. A conical rolled body is made from these strips by winding them in spiral form and said body is threaded into the puncture which is prepared correspondingly. The winding of the strips requires some practice but even then it cannot entirely be avoided that air pockets are formed in the rolled body. Furthermore, this kind of repair was developed mainly for relatively large punctures and cannot be completed without subsequently heating the damaged spot.

After filling the damaged spot in the manner as indicated and vulcanizing it by applying heat and pressure, the inner surface of the tire has to be coarsened again at this point, provided with a vulcanizing fluid and subsequently completed by applying a covering patch.

The invention originates from the idea that, on the one hand, the frequently invisible, fine transverse and fissure crazes radiating from the interior of the tear or puncture have to be blocked off by a material which is a plastic material whereas, on the other hand, the very complex movements imposed on the driven tires caused by the fulling action lead to tensile, and shrinkage stresses in rapid succession whereby an elastic filling is required for the puncture. Accordingly, the proposition of the invention is to create a filling for the repair of tears or punctures in automobile tires that is both plastic and elastic so that the filling remains completely packed not only in its entire length but also in its whole cross-section under all operating conditions and for the entire time in which the repaired tire remains in operation.

The invention solves this problem by filling the tear or puncture with a compound of non-vulcanized and vulcanized rubber having the properties that the non-vulcanized layers or portions which have no contact with a vulcanizing fluid or paste remain permanently non-vulcanized and plastic. The outer part which comes in contact with the wall of the hole passage in the tire is provided for a vulcanization contact, while at least one inner non-vulcanized layer remains permanently non-vulcanized even after the repair in order to guarantee a particularly high-elastic filling of the hole passage or the exit in the long run. Fissure crazes, unevenness and the like within the puncture wall and the hard-to-reach crevises of a tear or puncture are reached and closed safely by the plastic, non-vulcanized layers at the outside of the plug whereas the inner, non-vulcanized and plastic portion of the filling is used as a cushion. A shrinkage of the filling caused by ageing is reduced thereby so effectively that even after quite some time the cross-section cannot be impaired. The vulcanized and therewith elastic portions in the plastic caoutchouc act as a support as well as a kind of cushioning element for the stretching caused by the insertion of the repair body and also for the fulling movement caused by using the tire. These elastic portions or layers with their tendency to return to their original volume after each rotation support the action of the plastic outer layers by pressing them outwardly.

One object of the present invention is to provide a novel and improved repair body or plug for punctures in tires which provides a tight and permanent closing of the puncture.

Another object is to provide a plug of the above object which can be easily manufactured and manipulated.

Still a further object is to provide a repair body for the repair of punctures or tears in automobile tires with the repair body consisting of a puncture wall connecting layer of vulcanizable caoutchouc with supporting portions of elastic vulcanized caoutchouc and non-vulcanized portions of caoutchouc which remain non-vulcanized.

FIGURE 1 is a side view of a repair body according to the invention in its simplest form;

FIGURE 2 is an embodiment of the repair body;

FIGURE 3 is an end view of the structure of FIGURE 2;

FIGURE 4 is an end view showing an embodiment of the structure of FIGURE 2;

FIGURE 5 is a side view of an especially serviceable embodiment of a repair body according to the invention on an enlarged scale;

FIGURE 6 is a top view of an embodiment of the repair body shown in FIGURES 1 to 4;

FIGURE 7 is an enlarged cross-section through a repair body according to a further modification of the invention;

FIGURE 8 is a cross-section through an embodiment similar to FIGURE 6;

FIGURE 9 is a view partly in section of a punctured automobile tire and the inserted repair body according to the invention; and FIGURE 10 is a view partly in section showing a fully repaired tire puncture according to the invention.

The repair body in its simplest embodiment is seen in FIGURE 1 and is constructed of three layers of a different composition and structure which are tightly joined. The layer 1 consists of non-vulcanized caoutchouc containing neither sulphur, accelerators nor other agents effectuating the vulcanization so that there is no vulcanization of this layer even after the repair is completed. The layer 2, however, consists of non-vulcanized, vulcanizable caoutchouc being attained either by adding sulphur or accelerators. Both layers are separated by a layer 3 of vulcanized and therewith elastic caoutchouc.

As represented in dotted lines, the repair body according to FIGURE 1 is folded in the center and inserted into the puncture of a damaged automobile tire by using a suitable tool, i.e. an awl or a kind of fork. The layer 2 consisting of non-vulcanized, vulcanizable caoutchouc then is at the outside whereas the layer 1 being unvulcanized and completely, or for the most part remaining unvulcanized and plastic, stays inwardly in double volume either completely or for the most part.

The filling of the puncture with its special structure caused by the construction of the repair body and the folding as shown in FIGURE 1 brings about such an adaption of the repair body to the outlines of the tear or hole, that every place of the hole passage is filled with so much caoutchouc matter that there are no unfilled or insufficiently filled spaces. The pressure of the hole's walls can also squeeze portions of the non-vulcanized intermediate layer 1 into the spaces and fissures.

The layers 1 and 2 can be also of the same composition, that is they both could contain sulphur or accelerators because the liquid or paste that is applied outside after the folding and that contains the missing vulcanization component does not reach the inner layer or does so only very slightly. In this case, however, the intermediate uncured rubber layer 1 should remain unvulcanized even after insertion in the puncture to be repaired, and even after all other layers have become vulcanized, although layer 1 is of the same composition as the other uncured layer 2 which act as connecting layers. This is accomplished by making the vulcanized layers of such a composition that a transfer of vulcanizing agents not consumed during vulcanization is avoided (see U.S. Patent No. 2,803,283).

The same effect of folding as shown in FIGURE 1 can be achieved also by inserting several repair bodies simultaneously or one after another into the puncture.

It is suitable that the cross-section of the repair body is rectangular because a puncture in the tire caused by a foreign body is almost never a round hole but rather a flat tear. The rectangular cross-section makes it easy to carry into effect at first the plastic outer layers 2 so that the pointed edges of the tear are included and sealed. However, the cross-section can be also i.e. semicircular, all the more so as the plasticity of the outer layers permits a deformation that adapts to the configuration of the puncture.

The repair body according to FIGURE 2 consists of two outer non-vulcanized, vulcanizable plastic layers (connecting layers) 4 and 4a, two vulcanized and elastic rubber layers 5 and 5a that are adjacent the layers 4 and 4a and are connected with them, and an inner non-vulcanized plastic layer 6 which remains non-vulcanized. Due to this structure, it is not absolutely necessary to fold the repair body before the insertion into the tear or puncture although even by using such a repair body this kind of insertion can be useful because of the reasons mentioned later. The repair body according to FIGURE 2 may have a rectangular or round cross-section as shown in FIGURES 3 and 4 and that would have no effect on the intended action of the combination of plastic and elastic layers.

In the embodiment according to FIGURE 5, there are finally two outer connecting layers of non-vulcanized, vulcanizable caoutchouc 4 and 4a and two inner plastic layers 6 and 6a remaining plastic supported and reinforced by a framework of three layers 5, 5a and 5b of fully vulcanized caoutchouc. This improved embodiment of a repair body according to the invention brings to light very impressively the effect and importance of the layered structure. The inner plastic layers being restricted and supported by elastic layers participate in lining the wall of the puncture only or to a slight extent only when the pressure of the wall is pressing portions from the interior to the sides. They come then in contact with the paste containing vulcanizing sulphur or accelerators and when these layers contain accelerators or sulphur according to the composition of the paste, the portions being squeezed out will enter eventually into a vulcanized compound with the wall. The major part of the inner plastic layers, however, will remain non-vulcanized and plastic and counteract the body's shrinking and hardening caused by ageing.

The repair bodies according to the invention are used in band form, especially when they have a rectangular cross-section whereby the individual layers have appropriately a thickness of less than 1 mm. The inner non-vulcanized layers can be thicker than the vulcanized layers so that the plasticity has a favorable effect and also more plastic substance is squeezed out. In order to facilitate the attachment to the tool for the insertion into the puncture and to attain the desired stretching which is necessary at the insertion because of reasons explained later on, the repair bodies can be provided with one or two notches or similar indentations 7 as shown in FIGURE 6 which is a top view representing the repair body in about its actual size while the view according to FIGURE 5 shows the layers drawn in extra strong lines.

The sections shown in FIGURES 7 and 8 represent further modifications of a repair body according to the invention. Here, non-vulcanized caoutchouc 8 supports embedded elements 9 in the form of strips of vulcanized rubber. FIGURE 7 illustrates the cross-section 8 encased with a special connecting layer 10 of mixture that differs from the composition of the substance 8 and is particularly suitable for the vulcanization compound. There is no such special connecting layer in the embodiment according to FIGURE 8. The substances contained in a vulcanizing fluid, i.e. the accelerators, that bring about the vulcanization act namely only in a thin marginal zone 11 (FIGURE 8) whereas the core remains non-vulcanized and therewith plastic as it is desired.

The insertion of the repair body according to the invention into a damaged tire is illustrated by FIGURES 9 and 10.

First of all the puncture is made slippery with a suitable tool, i.e. an awl or fork, and with a vulcanizing paste. Thereby, the ends of the cord that are torn loose and in the passage are rubberized. Thereupon, a repair body at its narrow point (indentations 7) is squeezed into the ear of the awl which is preferably open on one side only. Repair body and awl are coated with a vulcanizing paste or are dipped in it. If the awl 12 with the repair body 13 is pressed into the tear passage of the tire, the repair body folds around the awl with each half 14 and 14a; thus, it is folded. With the help of the indentations 7 a relatively intense stretching of the repair body is attained thereby in axial direction A. The rubber substance gets so much smaller in the insertion that it is pressed tightly around the inserting tool. The volume threaded in this way through the passage is not too large; therefore, the insertion is very easy and the already existing tears are not enlarged. The stretching affects in particular the part 15 that is not held by the wall of the tire and thereby the elastic layers 5 to 5b especially are stressed. With the removal of the tool, the part 15 snaps out of the ear and the contractions caused by the elastic layers enlarge the volume of the elastic layers which were previously stretched intensely. They also cause the plastic outer layers or the portions being pressed from the inner plastic layers outwards to press against and into the wall of the puncture respectively its unevenness.

Furthermore, there is not only a plastic and elastic filling in the hole passage, but a second sealing is created at the exit of the hole 16 in the inner tire by said plastic and elastic material. Namely, a ball-shaped head 17 forms which settles at the hole exit at the inner wall of the tire thus forming a second seal against the penetration of compressed air into the cord layers 18. This ball-shaped head consisting of elastic and plastic material is secured so tightly at the inner wall of the tire respectively at the hole exit that it is not at all affected by the gyroscopic action of the operated tire. This pin head-shaped inner seal intergrows and becomes a whole with the tire 19.

The intended stretching is also favored in such a way that only one part, namely only the elastic layers, resists the stretching. The plasticity of the non-vulcanized, vulcanizable outer layers is thereby increased still considerably by the absorption of the vulcanizing paste.

The multi-layer repair body according to the invention is also suitable for repairs on the sides where vulcanized rubber plugs, hollow bodies, or rubber strips in particular would not be satisfactory. By its great elasticity and its adaption capacity caused by the plastic component the repair body remains fastened also in tires with thin walls and can withstand every fulling action. This applies, too, for the two-layer tires offered recently that have a very flexible and thin-walled carcass.

Obviously many modifications and variations of the present invention are possible in the light of the above teachings. It is, therefore, to be understood that within the scope of the appended claims the invention may be practiced otherwise than as specifically described.

What is claimed is:

1. A tire repair body for repairing punctures in tires comprising a pair of elastic supporting members of vulcanized material, connecting means on the outer side of each supporting member for securing said body to the tire, said connecting means being made of uncured self-vulcanizing material, a plastic uncured rubber-like layer secured to and between said supporting members and said layer being of non-vulcanized material adapted to remain uncured and plastic after said body is inserted into the puncture of the tire.

2. The tire repair body of claim 1 wherein said connecting means and said layer are both formed of vulcanizable material.

3. The tire repair body of claim 1 wherein the body has a rectangular cross-section.

4. The body of claim 1 wherein the body has indented portions.

5. A tire repair body for repairing punctures in tires comprising an elastic supporting member of vulcanized material, connecting means on the outer surface of said supporting member for securing said body to the tire, said connecting means being made of an uncured self-vulcanizing material, at least one plastic uncured rubber-like strand imbedded in said supporting member, and said strand being of a non-vulcanized material adapted to remain uncured and plastic after said body is inserted into the puncture of the tire.

6. The tire repair body of claim 5 wherein said connecting means and said layer are both formed of vulcanizable material.

7. A cylindrical-shaped tire repair body for repairing punctures in tires comprising a center strand of non-vulcanized material, a surrounding layer of vulcanized material, an outermost layer of vulcanizable material and all of said layers and said center strand being formed of caoutchouc.

8. A tire repair body for repairing punctures in tires comprising inner alternating layers of non-vulcanized and vulcanized material, and outer layers of vulcanizable material.

9. The tire repair body of claim 8 wherein all layers are formed of caoutchouc.

10. The body of claim 9 wherein the body has indented portions.

11. A tire repair body for repairing punctures in tires comprising a mass of non-vulcanized material, strands of vulcanized material embedded in said mass, and an outer casing of vulcanizable material around said mass.

12. The tire repair body of claim 11 wherein the mass, the strands and casing are formed of caoutchouc.

13. The tire repair body of claim 11 wherein the body is cylindrical shaped.

14. The tire repair body of claim 11 wherein the body is rectangular shaped.

15. A tire repair body for repairing punctures in tires comprising an elastic supporting member of vulcanized material, connecting means on one side of said supporting member for securing said body to said tire, said connecting member being of an uncured self-vulcanizing material, a plastic uncured rubber-like layer secured to the other side of said supporting member, and said layer being of non-vulcanized material adapted to remain uncured and plastic after said body is inserted into the puncture of the tire.

16. The tire repair body of claim 15 wherein the body has a semicircular shape, and said layer being of greater width than said connecting means.

17. The body of claim 15 wherein the body has indented portions.

18. The tire repair body of claim 15 wherein said connecting means and said layer are both formed of vulcanizable material.

References Cited by the Examiner
UNITED STATES PATENTS

| | | | |
|---|---|---|---|
| 466,169 | 12/91 | Hume. | |
| 931,056 | 8/09 | Glanz | 152—370 |
| 1,296,349 | 3/19 | Wood | 152—370 |
| 1,503,701 | 8/24 | Morton et al. | 152—367 X |
| 2,966,189 | 12/60 | Chambers et al. | 152—370 |
| 3,039,509 | 6/62 | Gruber | 152—367 |
| 3,095,342 | 6/63 | Kraly | 152—37 X |

ARTHUR L. LA POINT, *Primary Examiner.*